G. PATERSON.
Cotton-Planters.

No. 139,732. Patented June 10, 1873.

Witnesses:
A. Bennewendorf.
(Sedgwick)

Inventor:
G. Paterson
per
Attorneys.

UNITED STATES PATENT OFFICE.

GEORGE PATERSON, OF WAYNESBOROUGH, GEORGIA.

IMPROVEMENT IN COTTON-PLANTERS.

Specification forming part of Letters Patent No. 139,732, dated June 10, 1873; application filed February 21, 1873.

*To all whom it may concern:*

Be it known that I, GEORGE PATERSON, of Waynesborough, in the county of Burke and State of Georgia, have invented a new and useful Improvement in Cotton-Planter and Guano-Distributer, of which the following is a specification:

The invention consists in the improvement of cotton-planters, as hereinafter described and pointed out in the claim.

Figure 1:
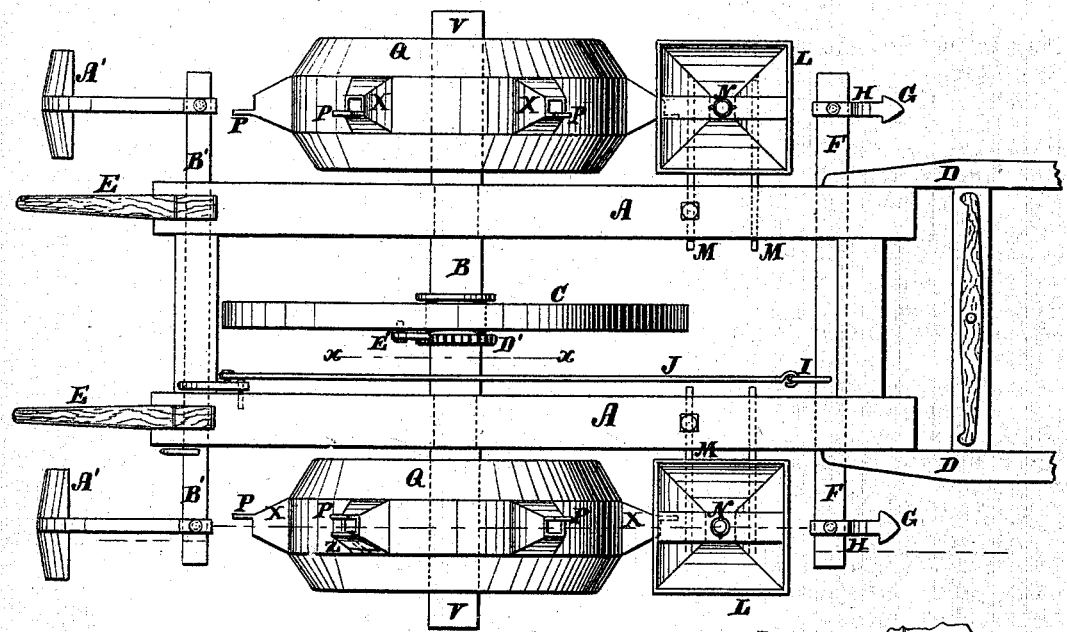
Figure 2:
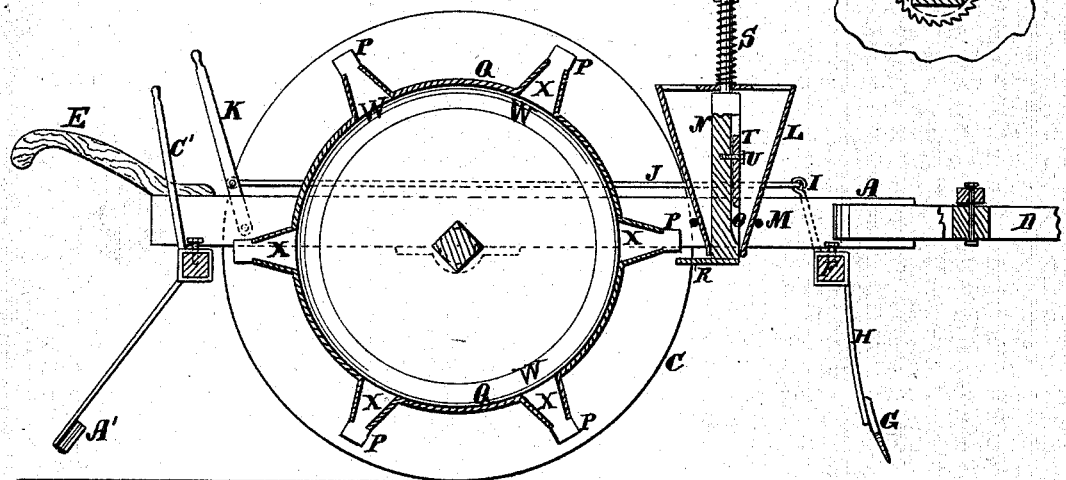
Figure 3:
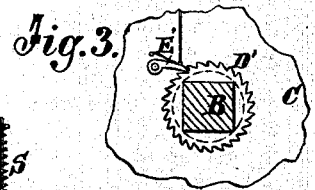

Figure 1 is a plan view of my improved cotton-planter and guano-dropper. Fig. 2 is a longitudinal sectional elevation, and Fig. 3 is a section of Fig. 1 on the line $x\ x$.

A is a narrow frame of wood, or other substance, resting on an axle, B, supported, at its center, in a single truck-wheel, C. D represents thills, attached to the frame at the front end, to hitch it to the animal for drawing the machine; also, for supporting the front end. E represents handles at the rear end, by which to guide and control the machine. Near the front is a cross-bar, F, arranged in bearings so as to oscillate, and projecting considerably beyond the frame on each side. G represents the plows for opening the furrows. They are suspended from the projecting portions of this cross-bar by shanks H, which are fitted on so as to be readily shifted toward or from the frame. The cross-bar is connected, by an arm, I, and rod J, with a shifting lever, K, at the rear of the frame, by which the plows may be swung up or down to regulate their height from the ground. A ratchet-bar of any kind, or a pin and a series of holes in the frame, will be arranged with the hand-lever, to hold it and the plows, as required. Behind the plows are the guano-hoppers L, supported on iron rods or bars M, or other supports, adjustable toward or from the frame. N represents vertical slides in the hoppers with pockets O to fill with the guano as they rise up in the hopper, and carry it down to discharge below. Said slides are pushed down by tappets P on the seed-dropping wheels Q acting on projections R on the slide, and they are forced up by a spring, S, when the tappets escape from the projections.

The pockets are varied as to capacity by adjustable blocks T, held by binding-screws U, so they can be readily loosened, shifted, and fastened again.

The seed-dropping drums or wheels are hollow sheet-metal cases mounted on projections of the shaft B. Near the periphery the sides converge for a short distance, and in the periphery are large openings W, as far aprat as the required distance between the droppings, which are surrounded on the outside. X is a circumjacent pocket, being the frustum of a square pyramid with its base resting upon the periphery of wheel, and with an opening at the outer end. Behind the seed-dropping wheels the covering-scrapers A' are suspended from a cross-bar, B', to drag along the ridges turned up by the plows and scrape back the earth into the furrows. They are notched or grooved in the front and under sides, as these scrapers ordinarily are, for facilitating the gathering of the earth into the furrows. They are also adjustable along the cross-bar B', and they are raised or lowered by a hand-lever, C', attached to the cross-bar, which is arranged in bearings so as to oscillate. The lever C' will be secured by a ratchet-bar, or other equivalent means for holding the scrapers. The plows and the scrapers do not extend so low as the bottom of the wheel C, because they are to act on the ridges, while the wheel runs in the hollow between them; and the dropping-wheels do not extend as low as the plows and scrapers, because they are not required to touch the ground at all. On the contrary they are kept above it to prevent the discharge-holes of the pockets from being clogged by the earth. They will not be clogged by the seed, because their shape is such that all the seed will fall out into the space below as soon as they rise high enough so as to completely clear each discharge at every revolution of the wheel.

The wheel C is fitted loosely on the shaft, and engages it, by a ratchet, D', and pawl E', to turn it when going forward, but which allows it to turn backward without turning the shaft; and when it is required to run the machine along the road the wheel will run forward loosely if the pawl be lifted and held out of the ratchet-teeth, for which suitable contrivances will be provided.

The scrapers or coverers and the plows will materially assist the attendant in balancing the machine on the one wheel.

The relative arrangement of the guano-droppers and the seed-droppers is such that the seed and the guano will be dropped together. It will be seen that a great economy of labor will be effected by the use of this machine, which combines eight separate and special machines in one, requires only one horse or mule and one attendant, and neither the horse nor the attendant has to walk along the ridges and tramp the earth down, as when separate machines are used, or even one set of the machines here shown, for one row combined on a two-wheeled truck, as some machines of a like character have heretofore been arranged.

Having thus described my invention, I claim as new and desire to secure by Letters Patent—

The vertical pocket-slide N, arranged to reciprocate up and down in a guano-dropper, as and for the purpose described.

GEORGE PATERSON.

Witnesses:
A. P. THAYER,
T. B. MOSHER.